UNITED STATES PATENT OFFICE.

LORENZ ACH AND FRITZ ACH, OF MANNHEIM, GERMANY, ASSIGNORS TO
C. F. BOEHRINGER & SOEHNE, OF WALDHOF, GERMANY.

DICHLORO-OXYPURIN AND PROCESS OF MAKING SAME.

SPECIFICATION forming part of Letters Patent No. 654,122, dated July 24, 1900.

Application filed June 14, 1897. Serial No. 640,762. (Specimens.)

*To all whom it may concern:*

Be it known that we, LORENZ ACH and FRITZ ACH, citizens of the Empire of Germany, residing at Mannheim, Germany, have invented certain new and useful Improvements in the Art of Preparing Purins; and we do hereby declare the following to be a full, clear, and exact description of the invention, such as will enable others skilled in the art to which it appertains to make and use the same.

The present invention relates to the art of preparing compounds belonging to the class known as "purins," and more particularly to halogen-oxy-purins such as the body which we are the first to have produced and which we term "dichloro-oxy-purin."

For an explanation of the term "purin" employed in this specification reference is made to *Berichte der Deutschen Chemischen Gesellschaft*, Vol. 30, p. 549 and to *Abstracts of the British Chemical Society*, Vol. 46, (1884,) p. 996 *et. seq.*

Purin derivatives, such as chloro-methyl-purins or chlorated methyl-purins, of which dichloro-oxy-dimethyl-purin having the structural formula:

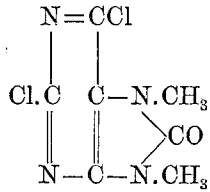

(see *Berichte der Deutschen Chemischen Gesellschaft*, Vol. 17, p. 1782, and *Abstracts of the British Chemical Society*, Vol. 44, p. 996,) may be given as an example, have hitherto been obtained from various alkyl derivatives of uric acid and xanthin (among them theobromin and caffein) by the action of phosphorus-pentachlorid in connection with phosphorus-oxy-chlorid, which acts as a solvent. (*Berichte der Deutschen Chemischen Gesellschaft*, Vol. 17, p. 330, and Vol. 28, p. 2480.) Hitherto, however, all attempts to remove oxygen from uric acid, and thus to attain the production of purin derivatives free from methyl, have been unsuccessful. (*Berichte der Deutschen Chemischen Gesellschaft*, Vol. 17, p. 329.)

All attempts to convert uric acid proper—that is to say, uric acid in which none of the four nitrogen atoms have been combined with an alkyl radical—into a chloro-purin have failed. I have found that this failure must be attributed to the fact that in all cases such conversion has been attempted by causing phosphorus-oxy-chlorid to act upon such uric acid proper, together with phosphorus-penta-chlorid. This method, while it leads to good results with alkylized uric acids, is attended by a complete destruction of uric acid proper. It is my discovery that the production of alkyl-free-chloro-purins may be attained if we employ only phosphorus-oxy-chlorid without any addition of phosphorus-penta-chlorid. In all the former processes and experiments with methylized or alkylized uric acids the phosphorus-oxy-chlorid performed merely the part of a solvent and diluting medium, while the function of withdrawing the oxygen and at the same time chlorinating the uric acid was performed solely by the phosphorus-pentachlorid. All the prior experimenters failed to recognize the fact that the phosphorus-oxychlorid alone could be employed to perform this latter function of chlorinating the uric acid. The gist of our invention, therefore, is based mainly upon our discovery that phosphorus-oxy-chlorid alone may be employed for chlorinating uric acids.

It is the object of our invention to attain this result; and the said invention consists in the method which we have discovered for accomplishing this purpose and in the compound which is produced in carrying out the said method.

Our invention consists, primarily, in the action of a phosphorus-oxy-halogen compound, such as phosphorus-oxy-chlorid, upon uric acid and also the salts of uric acid.

The invention, moreover, consists in such details of the method thus broadly characterized and other features, as will be hereinafter set forth, and pointed out in the claims hereunto appended.

We will now proceed to describe the same as applied to the production of the new compound, "dichloro-oxy-purin," having the composition indicated by the formula $C_5H_2N_4OCl_2$. The salts hitherto employed in this process are the acid potassium, sodium, ammonium, magnesium, calcium, and barium salts of uric acid.

In illustration of our invention we will now proceed to describe what we consider the best method of carrying the same into effect. We will first show how the same may be obtained by the action of phosphorus-oxy-chlorid upon a dry salt of uric acid and then describe its production by causing the phosphorus-oxy-chlorid to act upon the free uric acid.

*Example 1.*—The following example will serve to fully illustrate our invention when employing a urate: One kilogram of acid urate of potassium in a dry state is well mixed with one and two-tenths kilograms of phosphorus-oxy-chlorid, then heated to 160° centigrade and maintained at this temperature for four hours in a closed vessel. The excess of oxy-chlorid is distilled off, and the residue is then washed with water. The resulting product is not quite pure, since a small amount of unchanged uric acid remains therein. All impurities are, however, readily removed by nitric acid. The dichlor-oxy-purin may also be obtained in a pure condition by separating the same in the form of an ammonium-salt from aqueous or alcoholic solutions.

*Example 2.*—When employing free uric acid, the following is the preferable method of proceeding: One part, by weight, of uric acid, together with five parts, by weight, of phosphorus-oxy-chlorid, is heated in a digester to from 170° to 175° centigrade and maintained at this temperature for from twenty-four to thirty hours, the mass being constantly agitated. After the lapse of this time the uric acid is completely dissolved. The resulting liquor, which has a brownish color, is evaporated to complete dryness *in vacuo* to remove the phosphorus-oxy-chlorid. The amorphous residue is dissolved in alcohol, (preferably pure.) The dichlor-oxy-purin separates out of the clear alcoholic solution in the form of coarse yellow crystalline grains after boiling for a half-hour and concentrating. To completely purify the same, it is warmed or heated for a short time with nitric acid of the specific gravity 1.41. It is thus obtained colorless. The yield is about from forty-five to fifty per cent. of the uric acid employed.

Dichlor-oxy-purin is a dibasic acid which decomposes carbonates on boiling. It is distinguished from uric acid principally by the fact that it is affected with far greater difficulty by oxidizing agents—such as, for example, strong nitric acid. Moreover, it forms a permanent silver salt with an ammoniacal silver solution. It is soluble with extreme difficulty in water. From alcohol, by which it is taken up only with difficulty, it is obtained in very small needles, which are decomposed at a temperature of over 300° centigrade. By methylation the dichlor-oxy-purin is very readily converted into dichlor-oxy-dimethyl-purin, which has already been prepared by Emil Fischer, and which has the following composition:

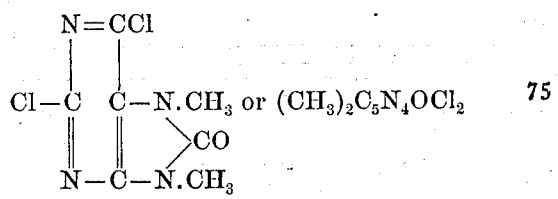

(see *Berichte der Deutschen Chemischen Gesellschaft,* Vol. 17, pp. 328 and 1787.) From this it follows that the present product, which is free from alkyl—namely, the dichloro-oxy-purin—must have the composition indicated in the following formula:

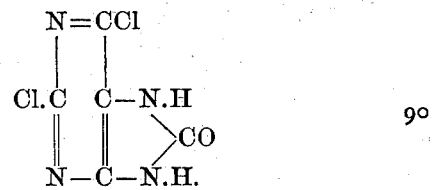

From the location of the chlorine and oxygen atoms we designate the same as (2-6) dichlor (8) oxy-purin.

It will be seen from the above that the process may be varied in many respects without departing from our invention. Instead of the potassium urate other salts of uric acid may, for example, be employed, the essential point of the invention, broadly considered, being the treatment of a uric-acid radical comprised either in uric acid proper or in a urate, with an oxy-halogen compound of phosphorus, differing in this respect materially from the processes set forth in United States Patents Nos. 631,758 and 631,759 of August 22, 1899, to Fritz Ach, under which alkyl uric acids are so treated.

What we claim, and desire to secure by Letters Patent, is—

1. The process which consists in acting upon a compound containing the acid radical of uric acid proper with an oxy-halogen compound of phosphorus.

2. The process which consists in acting upon a urate with an oxy-halogen compound of phosphorus.

3. The process which consists in acting upon a urate with oxy-chlorid of phosphorus.

4. The process which consists in acting upon an acid urate with oxy-chlorid of phosphorus.

5. The process which consists in heating acid urate with phosphorus-oxy-chlorid in the proportions and in the manner substantially as specified.

6. The process which consists in heating acid urate of potassium with phosphorus-oxy-chlorid in the proportions and in the manner substantially as specified, then distilling off the excess of oxy-chlorid and washing the residue.

7. The process which consists in heating dry acid urate of potassium with phosphorus-oxy-chlorid in the proportions and in the manner substantially as specified, then distilling off the excess of oxy-chlorid and washing the residue and purifying the same.

8. As a new compound dichlor-oxy-purin having the formula hereinbefore given, which forms a dibasic acid attacked only with difficulty by nitric acid, which is soluble only with difficulty in water and alcohol, from the latter of which it crystallizes in small needles which are decomposed at a temperature over 300°, centigrade, and which forms a permanent silver salt remaining unchanged in an ammoniacal solution.

In testimony whereof we affix our signatures in presence of two witnesses.

LORENZ ACH.
FRITZ ACH.

Witnesses:
ARTHUR GÜHUN,
JACOB ADRIAN.